(12) United States Patent
Trattler et al.

(10) Patent No.: US 11,946,801 B2
(45) Date of Patent: Apr. 2, 2024

(54) SENSING SYSTEM

(71) Applicant: ams-OSRAM AG, Premstaetten (AT)

(72) Inventors: Curd Trattler, Gratwein-Straßengel (AT); Klaus Schmidegg, Gleisdorf (AT)

(73) Assignee: AMS-OSRAM AG, Premstaetten (AT)

( * ) Notice: Subject to any disclaimer, the term of this patent is extended or adjusted under 35 U.S.C. 154(b) by 0 days.

(21) Appl. No.: 18/042,477

(22) PCT Filed: Aug. 17, 2021

(86) PCT No.: PCT/EP2021/072802
§ 371 (c)(1),
(2) Date: Feb. 22, 2023

(87) PCT Pub. No.: WO2022/043128
PCT Pub. Date: Mar. 3, 2022

(65) Prior Publication Data
US 2023/0324217 A1    Oct. 12, 2023

(30) Foreign Application Priority Data
Aug. 25, 2020   (GB) .................................... 2013261

(51) Int. Cl.
   *G01J 1/42*   (2006.01)
   *G01J 1/02*   (2006.01)
   *G01J 1/04*   (2006.01)

(52) U.S. Cl.
   CPC .......... *G01J 1/4204* (2013.01); *G01J 1/0219* (2013.01); *G01J 1/0488* (2013.01); *G01J 2001/4252* (2013.01)

(58) Field of Classification Search
   CPC ...... G01J 1/4204; G01J 1/0219; G01J 1/0488; G01J 2001/4252; G01J 2001/4247
   See application file for complete search history.

(56) References Cited

U.S. PATENT DOCUMENTS

| 7,518,715 B1 * | 4/2009 | Hamilton, II ............. G01J 1/18 356/229 |
| 2009/0316147 A1 | 12/2009 | Hamilton, II et al. |
| 2019/0301932 A1 | 10/2019 | Sarkar et al. |

OTHER PUBLICATIONS

International Preliminary Report on Patentability dated Feb. 28, 2023, PCT Application No. PCT/EP2021/072802, 10 pages.
International Search Report dated Dec. 1, 2021, PCT Application No. PCT/EP2021/072802, 11 pages.

\* cited by examiner

*Primary Examiner* — Tony Ko
(74) *Attorney, Agent, or Firm* — MH2 TECHNOLOGY LAW GROUP LLP (57) ABSTRACT

A sensing system comprising a light filtering apparatus configured to pass a first wavelength of light corresponding to an emission spectrum characteristic of Mercury. The sensing system comprises a sensor configured to receive light passed by the light filtering apparatus and produce a sensor response that is indicative of the light passed by the light filtering apparatus. The sensing system comprises a processor configured to use the sensor response to distinguish between light emitted by a fluorescent light source and light emitted by a light emitting diode.

21 Claims, 9 Drawing Sheets

SENSING SYSTEM

CROSS-REFERENCE TO RELATED APPLICATIONS

The present application is a national stage entry from International Application No. PCT/EP2021/072802, filed on Aug. 17, 2021, published as International Publication No. WO 2022/043128 A1 on Mar. 3, 2022, and claims priority to Great Britain Application 2013261.9 filed Aug. 25, 2020, the disclosures of all of which are hereby incorporated by reference herein in their entireties.

TECHNICAL FIELD OF THE DISCLOSURE

This disclosure relates to a sensing system, particularly but not exclusively to an ambient light sensing system suitable for use in a mobile phone.

BACKGROUND OF THE DISCLOSURE

The present disclosure relates to a sensing system, which may form part of an electronic device such as a mobile phone.

Known sensing systems comprise a simple light filter and a sensor configured to receive light filtered by the light filter. The light filter typically consists of a mixture (e.g. a paint) comprising a plurality of organic compounds (i.e. pigments) configured to transmit a range of wavelengths. The light filter and the sensor may collectively be referred to as a red, green, blue sensor or an RGB sensor.

A problem associated with known sensing systems is that they are not capable of distinguishing between different types of light that are emitted by different types of light source (e.g. light emitted by the sun, light emitted by fluorescent light sources, light emitted by incandescent light sources and light emitted by light emitting diodes (LEDs)).

It is therefore an aim of the present disclosure to provide a sensing system and method that address one or more of the problems above or at least provides a useful alternative.

SUMMARY

According to one aspect of the present disclosure, there is provided a sensing system comprising a light filtering apparatus configured to pass a first wavelength of light corresponding to an emission spectrum characteristic of Mercury. The sensing system comprises a sensor configured to receive light passed by the light filtering apparatus and produce a sensor response that is indicative of the light passed by the light filtering apparatus. The sensing system comprises a processor configured to use the sensor response to distinguish between light emitted by a fluorescent light source and light emitted by a light emitting diode.

Light emitted by a fluorescent light source and light emitted by a light emitting diode (LED) produce similar spectrums in the visible and infrared spectral ranges. These light types are therefore difficult to tell apart.

The sensing system of the present invention advantageously uses an emission spectrum characteristic of Mercury (a chemical element that is present in fluorescent light sources and not present in LEDs) to distinguish between light emitted by a fluorescent light source and light emitted by an LED. Light type distinguishing information produced by the sensing system may be used to improve an accuracy of a colour sensor and/or an accuracy of an electronic display configured to display a colour image. The present invention may be advantageously applied to a large range of devices including mobile phones, tablet computers, computer monitors, interactive displays, etc.

The light filtering apparatus may be configured to pass a visible portion of the electromagnetic spectrum. The visible portion of the electromagnetic spectrum may correspond to a visible wavelength range of the standard observer. Visible light may correspond to light having a wavelength of about 380 nm or more. Visible light may correspond to light having a wavelength of about 700 nm or less.

The light filtering apparatus may be configured to pass red light as perceived by the standard observer. The light filtering apparatus may comprise a red filter. The red filter may be configured to pass red light. Red light may correspond to light having a wavelength of about 380 nm or more. Red light may correspond to light having a wavelength of about 700 nm or less. Red light may correspond to light having a wavelength of about 430 nm or more. Red light may correspond to light having a wavelength of about 650 nm or less. Red light may correspond to light having a wavelength of about 560 nm or more. Red light may correspond to light having a wavelength of about 580 nm or less. Red light may correspond to light having a wavelength of about 580 nm.

The light filtering apparatus may be configured to pass green light as perceived by the standard observer. The light filtering apparatus may comprise a green filter. The green filter may be configured to pass green light. Green light may correspond to light having a wavelength of about 380 nm or more. Green light may correspond to light having a wavelength of about 700 nm or less. Green light may correspond to light having a wavelength of about 500 nm or more. Green light may correspond to light having a wavelength of about 630 nm or less. Green light may correspond to light having a wavelength of about 530 nm or more. Green light may correspond to light having a wavelength of about 540 nm or less. Green light may correspond to light having a wavelength of about 540 nm.

The light filtering apparatus may be configured to pass blue light as perceived by the standard observer. The light filtering apparatus may comprise a blue filter. The blue filter may be configured to pass blue light. Blue light may correspond to light having a wavelength of about 380 nm or more. Blue light may correspond to light having a wavelength of about 650 nm or less. Blue light may correspond to light having a wavelength of about 400 nm or more. Blue light may correspond to light having a wavelength of about 500 nm or less. Blue light may correspond to light having a wavelength of about 420 nm or more. Blue light may correspond to light having a wavelength of about 480 nm or less. Blue light may correspond to light having a wavelength of about 440 nm.

The light filtering apparatus may comprise an infrared filter. The infrared filter may be configured to pass infrared light. The light filtering apparatus may be configured to pass infrared light. Infrared light may have a wavelength of about 700 nm or more. Infrared light may have a wavelength of about 1000 nm or less.

The sensor response may comprise energy content values (e.g. intensity values and/or power values and/or irradiance values and/or illuminance values) for red light (R) and/or green light (G) and/or blue light (B) and/or infrared light (IR).

The sensor response may comprise a null response. For example, the sensor response may demonstrate that light having the first wavelength has not been detected.

The sensor may comprise a plurality of sensing elements. The plurality of sensing elements may be referred to as pixels. The plurality of sensing elements may comprise photodiode, CCD and/or a CMOS sensing elements. The plurality of sensing elements may be arranged to form an array. Different sensing elements may be configured to detect different wavelengths of electromagnetic radiation.

The light filtering apparatus may comprise a plurality of light filtering elements. The plurality of light filtering elements may be arranged to form an array. Different light filtering elements may be configured to pass light to different sensing elements of the sensor.

The first wavelength may be between about 509 nm and about 533 nm.

Mercury may emit a relatively low amount of light having a wavelength between about 509 nm and about 533 nm. The emission spectrum characteristic of Mercury may be an emission spectrum trough at a wavelength of between about 509 nm and about 533 nm.

An LED light source (which does not comprise Mercury) may emit a larger amount of light having a wavelength between about 509 nm and about 533 nm than a fluorescent light source (which comprises Mercury). The difference in sensor responses produced by the sensor may be used by the processor to distinguish between the LED light source and the fluorescent light source.

The first wavelength may be about 521 nm.

The inventors have discovered that detecting the presence or absence of light having a wavelength of 521 nm provides highly accurate light type distinguishing information.

The processor may be configured to compare the sensor response to a threshold value to distinguish between light emitted by a fluorescent light source and light emitted by a light emitting diode.

The threshold value may be predetermined. The threshold value may comprise an energy content value such as an intensity value and/or a power value and/or an irradiance value and/or an illuminance value. The processor may be configured to identify the light as having been emitted by a fluorescent light source if the sensor response is lower than the threshold value. The processor may be configured to identify the light as having been emitted by an LED if the sensor response is higher than the threshold value.

The light filtering apparatus may be configured to pass a second wavelength of light corresponding to a different emission spectrum characteristic of Mercury.

Considering two different emission spectrum characteristics of Mercury advantageously improves an accuracy of the light type distinguishing information.

The second wavelength may be between about 534 nm and about 558 nm.

A fluorescent light source (which does comprise Mercury) may emit a greater amount of light having a wavelength of between about 534 nm and about 558 nm than light having a wavelength of between about 509 nm and about 533 nm. The different emission spectrum characteristic of Mercury may be a spectral peak at a wavelength of between about 534 nm and about 558 nm.

An LED light source (which does not comprise Mercury) may emit a larger amount of light having a wavelength between about 534 nm and about 558 nm than a fluorescent light source (which does comprise Mercury). The difference in sensor responses produced by the sensor may be used by the processor to distinguish between the LED light source and the fluorescent light source.

The second wavelength may be about 546 nm.

The inventors have discovered that detecting the presence or absence of light having a wavelength of 546 nm provides highly accurate light type distinguishing information.

The light filtering apparatus may be configured to substantially block other wavelengths of light from reaching the sensor.

The processor may be configured to calculate a value that is at least partially dependent upon sensor responses to the first and second wavelengths of light. The processor may be configured to compare the value to a threshold value to distinguish between light emitted by a fluorescent light source and light emitted by a light emitting diode.

Comparing a value that is at least partially dependent upon two different emission spectrum characteristics of Mercury advantageously improves an accuracy of the light type distinguishing information.

The value may comprise a ratio of the sensor responses to the first and second wavelengths of light.

The light filtering apparatus may be configured to pass green light. The processor may be configured to calculate a value that is at least partially dependent upon sensor responses to the first and second wavelengths of light and the green light. The processor may be configured to compare the value to a threshold value to distinguish between light emitted by a fluorescent light source and light emitted by a light emitting diode.

Comparing a value that is at least partially dependent upon two different emission spectrum characteristics of Mercury and a prominence of green light advantageously improves an accuracy of the light type distinguishing information. Considering green light may advantageously allow the sensing system to weight measurement results in a way that is similar to how the human eye weights detected light based upon the colour of the light.

The value may comprise a ratio of the sensor responses to the first and second wavelengths of light and the green light.

The light filtering apparatus may be configured to pass infrared light. The light filtering apparatus may be configured to pass green light. The processor may be configured to calculate a second value that is at least partially dependent upon sensor responses to the infrared light and the green light. The processor may be configured to compare the second value to a second threshold value to distinguish between light emitted by an incandescent light source or the sun, and light emitted by a fluorescent light source or a light emitting diode.

The sensing system is advantageously able to further distinguish between light emitted by an incandescent light source or the sun, and light emitted by a fluorescent light source or a light emitting diode.

The second value may comprise a ratio of the sensor responses to the infrared light and the green light.

The light filtering apparatus may be configured to pass blue light. The light filtering apparatus may be configured to pass red light. The processor may be configured to calculate a third value that is at least partially dependent upon sensor responses to the blue light, the red light and the green light. The processor may be configured to compare the third value to a third threshold value to distinguish between light emitted by an incandescent light source, and light emitted by the sun.

The sensing system advantageously offers the ability to distinguish between and identify all standard ambient light conditions (i.e. LEDs, sunlight, incandescent light sources (including halogen light sources) and fluorescent light sources).

The third value may comprise a ratio of the sensor responses to the blue light, the red light and the green light.

The light filtering apparatus may comprise an interference filter.

Using an interference filter advantageously provides the ability to select narrow-band wavelengths of interest. Using an interference filter advantageously avoids the need for producing multiple simplistic broadband filters (e.g. pigment mixtures) and multiple corresponding sensor regions for light filtered by the broadband filters.

According to a second aspect of the present disclosure, there is provided an electronic device comprising the sensing system of any preceding aspect. The electronic device comprises a colour sensing system configured to use light source distinguishing information provided by the processor of the sensing system.

The sensing system advantageously improves an accuracy of the colour sensing system by informing the colour sensing system of ambient light conditions (i.e. whether the electronic device is operating under LEDs, sunlight, incandescent light sources and/or fluorescent light sources).

The electronic device may comprise an electronic display. The electronic device may be configured to control the electronic display in at least partial dependence on light source distinguishing information provided by the sensing system.

The sensing system advantageously improves a colour display accuracy of the electronic display.

The electronic device may be configured to perform an automatic white balance of the electronic display in at least partial dependence on light source distinguishing information provided by the sensing system.

The sensing system advantageously provides light type distinguishing information that improves an accuracy of the auto white balancing process.

According to a third aspect of the present disclosure, there is provided a method of sensing light comprising filtering incident light to pass a first wavelength of light corresponding to an emission spectrum characteristic of Mercury. The method comprises detecting the filtered light to produce a sensor response that is indicative of detected light. The method comprises using the sensor response to distinguish between light emitted by a fluorescent light source and light emitted by a light emitting diode.

The method may comprise comparing the sensor response to a threshold value to distinguish between light emitted by a fluorescent light source and light emitted by a light emitting diode.

The method may comprise filtering incident light to pass a second wavelength of light corresponding to a different emission spectrum characteristic of Mercury. The method may comprise calculating a value that is at least partially dependent upon sensor responses to the first and second wavelengths of light. The method may comprise comparing the value to a threshold value to distinguish between light emitted by a fluorescent light source and light emitted by a light emitting diode.

The method may comprise filtering incident light to pass a second wavelength of light corresponding to a different emission spectrum characteristic of Mercury and to pass green light. The method may comprise calculating a value that is at least partially dependent upon sensor responses to the first and second wavelengths of light and the green light. The method may comprise comparing the value to a threshold value to distinguish between light emitted by a fluorescent light source and light emitted by a light emitting diode.

The method may comprise filtering incident light to pass infrared light and green light. The method may comprise calculating a second value that is at least partially dependent upon sensor responses to the infrared light and the green light. The method may comprise comparing the second value to a second threshold value to distinguish between light emitted by an incandescent light source or the sun, and light emitted by a fluorescent light source or a light emitting diode.

The method may comprise filtering incident light to pass blue light and red light. The method may comprise calculating a third value that is at least partially dependent upon sensor responses to the blue light, the red light and the green light. The method may comprise comparing the third value to a third threshold value to distinguish between light emitted by an incandescent light source, and light emitted by the sun.

The method may comprise controlling an electronic display in at least partial dependence on light source distinguishing information provided by the method of any preceding aspect.

The method may comprise performing an automatic white balance of the electronic display in at least partial dependence on light source distinguishing information provided by the method of any preceding aspect.

According to a fourth aspect of the present disclosure, there is provided a computer program comprising computer readable instructions configured to cause a computer to carry out a method according to any preceding aspect.

According to a fifth aspect of the present disclosure, there is provided a computer readable medium carrying a computer program according to any preceding aspect.

The light type identification information provided by the sensing system advantageously provides improved colour sensor calibration, which in turn improves the colour sensor's performance and accuracy.

Features of different aspects of the invention may be combined together.

BRIEF DESCRIPTION OF THE PREFERRED EMBODIMENTS

Some embodiments of the disclosure will now be described by way of example only and with reference to the accompanying drawings, in which:

FIG. 1, consisting of FIG. 1A and FIG. 1B, shows examples of emission spectra of two common sources of ambient light;

FIG. 2, consisting of FIG. 2A and FIG. 2B, shows examples of emission spectra of two other common sources of ambient light;

DETAILED DESCRIPTION OF THE PREFERRED EMBODIMENTS

Sensing systems operate under different types of ambient light that have been emitted by different types of light source. Common sources of ambient light include light emitted by the sun, light emitted by fluorescent light sources, light emitted by incandescent light sources and light emitted by light emitting diodes (LEDs). Incandescent light sources include light sources that involve heating a filament to a sufficient temperature to generate light, such as standard incandescent light sources comprising an inert gas mixture (e.g. nitrogen-argon) and halogen light sources (e.g. comprising iodine or bromine vapour).

The type of light incident upon a colour sensor effects colour detection. For example, a white piece of paper may appear to be yellow when observed using an incandescent light source, such as candlelight. As such, an accuracy of colour detection may be improved when the type(s) of light present are distinguishable and thereby identifiable. Accurate colour detection is important for a range of applications including photography, videography and accurately capturing and displaying images on electronic devices in general, such as mobile phones, tablet computers, interactive displays, etc.

Figure 1A:
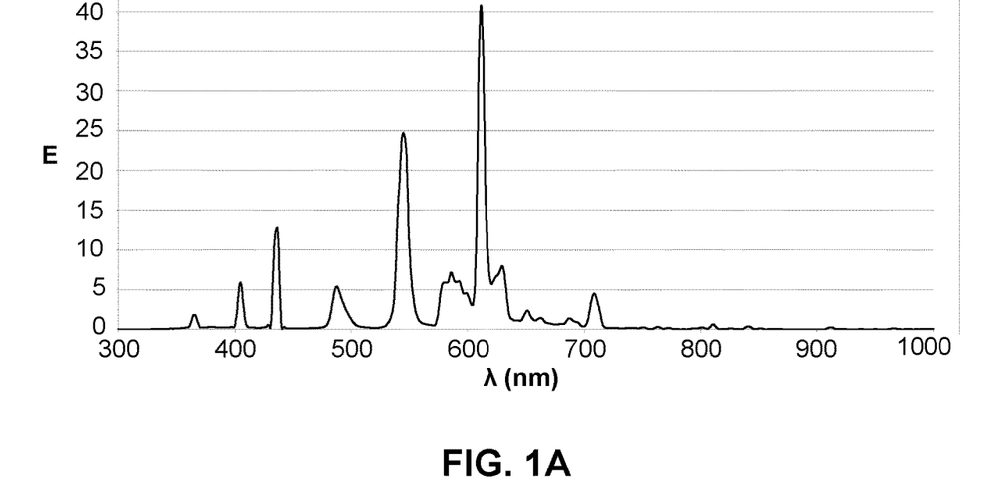
Figure 1B:
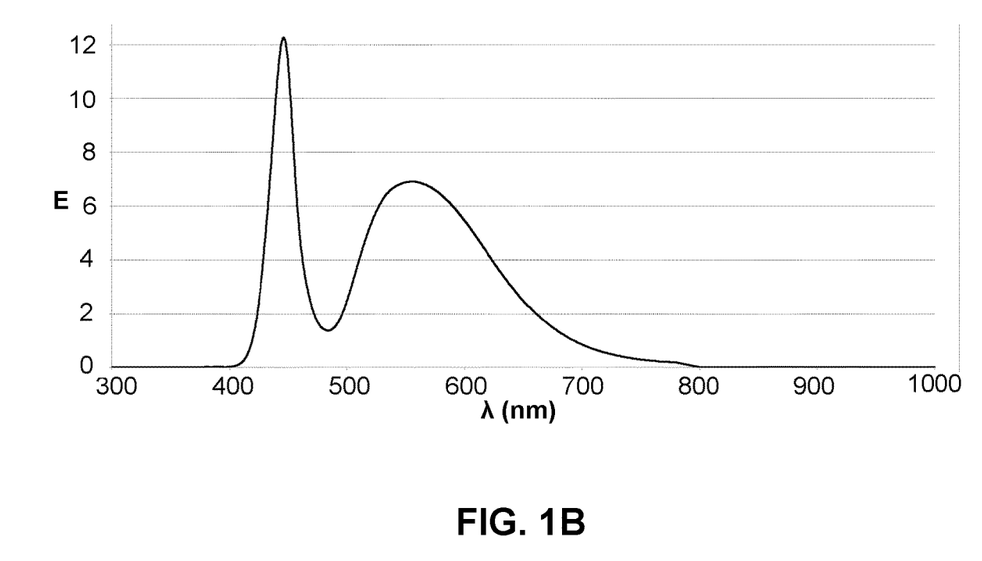

FIG. 1, consisting of FIG. 1A and FIG. 1B, shows examples of emission spectra of two common sources of ambient light. FIG. 1A shows an emission spectrum of a fluorescent light source and FIG. 1B shows an emission spectrum of a light emitting diode (LED). The x-axis of each graph represents wavelengths A of light from 300 nm to 1000 nm. The y-axis of each graph represents a relative energy content E of the light and is unit-less. If desired, the energy E may alternatively be represented using units of energy (Joules), power (Watts), intensity (Watts per square meter), illuminance (Lux), etc.

Figure 2A:
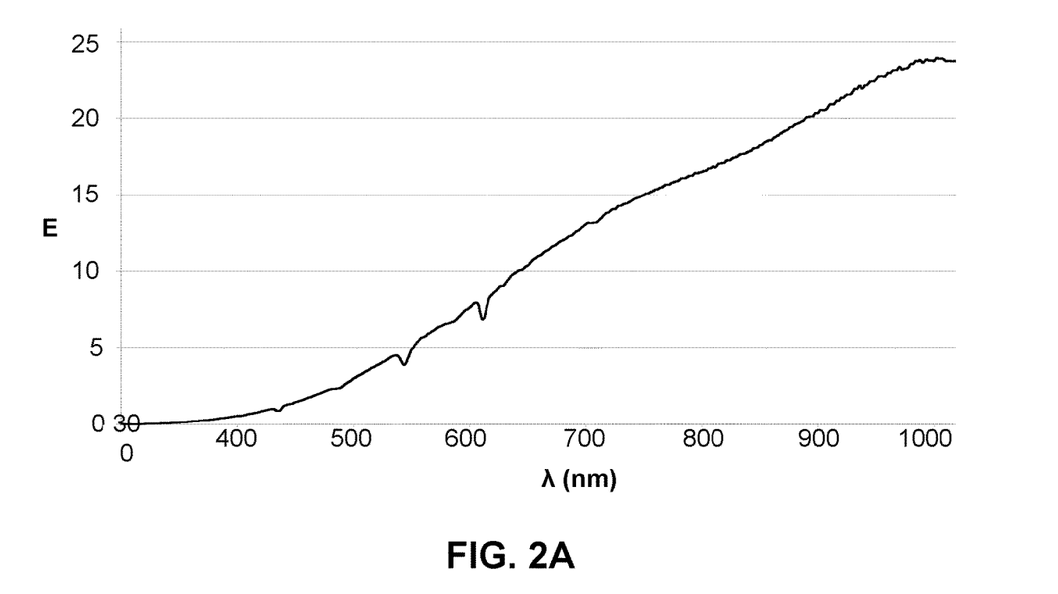
Figure 2B:
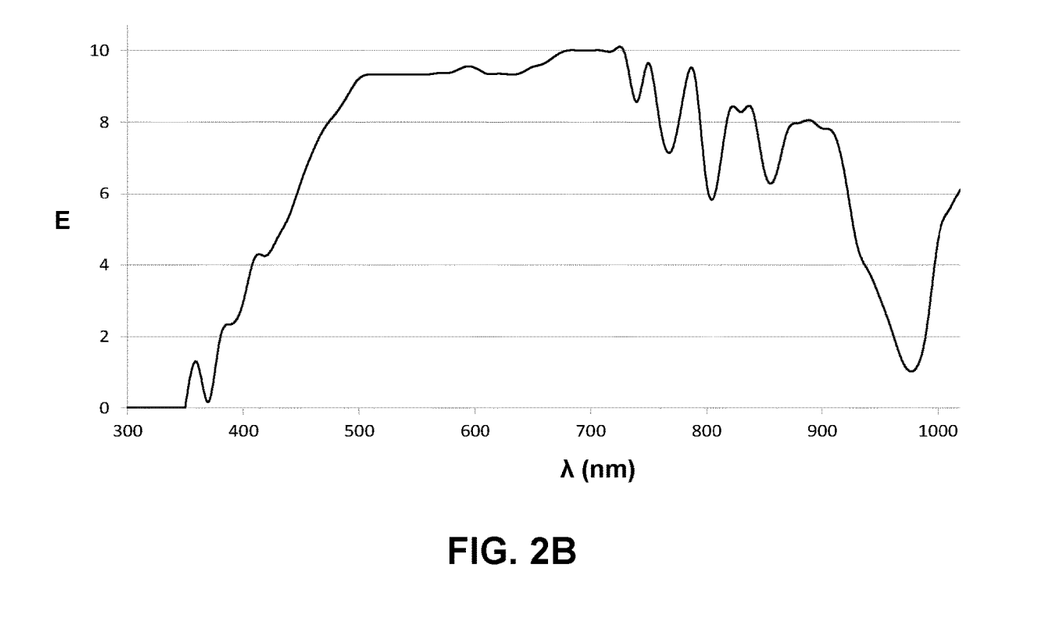

FIG. 2, consisting of FIG. 2A and FIG. 2B, shows examples of emission spectra of two other common sources of ambient light. FIG. 2A shows an emission spectrum of an incandescent light source and FIG. 2B shows an emission spectrum of the sun. As is the case for FIG. 1, the x-axis of each graph represents wavelengths A of light from 300 nm to 1000 nm. The y-axis of each graph represents the relative energy content E of the light and is unit-less. If desired, the energy content E may alternatively be represented using units of energy (Joules), power (Watts), intensity (Watts per square meter), illuminance (Lux), etc.

As demonstrated by the different spectra of FIG. 1 and FIG. 2, different sources of light have different emission spectrum characteristics. That is, knowledge of a characteristic feature of an emission spectrum of a light source may be used to identify light that has been emitted by that light source. The emission spectra may be broken up into different spectral regions. A visible spectral region may comprise wavelengths of light that are visible to the standard observer. The visible spectral region may correspond to light having a wavelength of between about 380 nm and about 700 nm. A red portion of the visible spectral region may correspond to light having a wavelength of between about 430 nm and about 650 nm. A green portion of the visible spectral region may correspond to light having a wavelength of between about 500 nm and about 630 nm. A blue portion of the visible spectral region may correspond to light having a wavelength of between about 400 nm and about 500 nm. An infrared spectral region may correspond to light having a wavelength of about 700 nm or more.

For example, sensing light emitted by the sun (e.g. FIG. 2B) with a color sensor (e.g. a sensor having tri-colour red, green and blue RGB or tri-stimulus XYZ sensitivity and infrared IR sensitivity) may generate a relatively large sensor response in the infrared IR spectral region and a relatively large sensor response in the visible RGB spectral region. As another example, sensing light emitted by an incandescent light source (e.g. FIG. 2A) may generate a relatively small sensor response in the visible RGB spectral region and a relatively large sensor response in the infrared IR spectral region. As such, sunlight and incandescent light may be distinguished from one another due to the differences in their emission spectra.

As a further example, sensing light emitted by an LED (e.g. FIG. 1B) may generate a relatively small sensor response in the infrared IR spectral region and a relatively large sensor response in the visible RGB spectral region. Similarly, sensing light emitted by a fluorescent light source (e.g. FIG. 1A) may generate a relatively small sensor response in the infrared IR spectral region and a relatively large sensor response in the visible RGB spectral region. That is, the sensor responses generated by an LED and a fluorescent light source at visible RGB and infrared IR wavelengths are similar. As such, light emitted by an LED and light emitted by a fluorescent light source are difficult to distinguish using these wide-band wavelengths.

An additional criterion may be considered to distinguish between light emitted by an LED and light emitted by a fluorescent light source. A component of a fluorescent light source that is not present in an LED is the chemical element Mercury. As is the case with other chemical elements, Mercury has characteristic features (e.g. peaks and troughs) in its emission spectrum. An emission spectrum characteristic of Mercury may be used to distinguish between light emitted by a fluorescent light source and light emitted by a light emitting diode.

Figure 3:
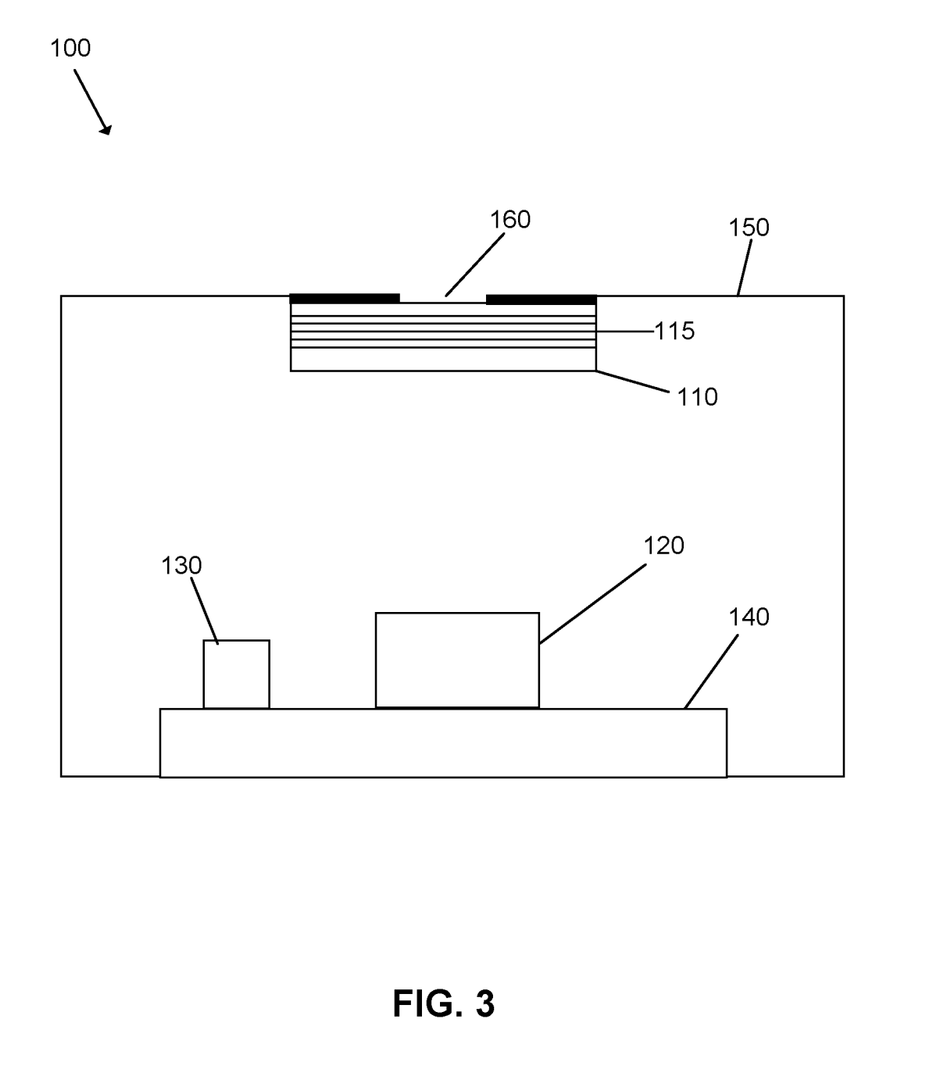
FIG. 3 schematically depicts a sensing system for distinguishing between different types of light.

FIG. 3 shows a sensing system 100. The sensing system 100 comprises a light filtering apparatus 110. The light filtering apparatus 110 may comprise a plurality of light filtering elements (not shown). For example, the light filtering apparatus 110 may comprise red, green and/or blue filters and/or an infrared filter. The plurality of light filtering elements may be arranged to form an array. The light filtering apparatus 110 may comprise an interference filter 115. The interference filter 115 may comprise a plurality of layers (e.g. between about twenty-five and about one-hundred and ten layers) of dielectric and/or metallic materials having different refractive indices and/or different thicknesses. The materials of the interference filter 115 may comprise, for example, silicon dioxide, niobium oxide, silver, aluminium, etc. The materials and the number and thicknesses of the layers may be selected such that the interference filter 115 transmits a desired range or ranges of wavelengths of light.

The sensing system 100 comprises a sensor 120 configured to receive light passed by the light filtering apparatus 110 and produce a sensor response that is indicative of the light passed by the light filtering apparatus 110. The sensor response may comprise intensity values and/or irradiance values and/or illuminance values for a red (R) and/or green (G) and/or blue (B) portion of the visible spectrum and/or an infrared (IR) portion of the spectrum. The sensor response may comprise a null response. For example, the sensor response may demonstrate that light a given wavelength has not been detected by the sensor 120. The sensor 120 may comprise a plurality of sensing elements (not shown). The plurality of sensing elements may be referred to as pixels. The plurality of sensing elements may comprise photodiode, CCD and/or a CMOS sensing elements. The plurality of sensing elements may be arranged to form an array. Different sensing elements may be configured to detect different wavelengths of electromagnetic radiation. Different light filtering elements of the light filtering apparatus 110 may be configured to pass light to different sensing elements of the sensor 120.

The sensing system 100 comprises a processor 130 configured to use the sensor response to distinguish between light emitted by different types of light source (e.g. fluorescent, LED, incandescent and/or the sun). The sensor 120 and the processor 130 may be located on a substrate 140, such as a printed circuit board. Electrical connections between the sensor 120 and the processor 130 may be routed through the substrate 140. The components of the sensing system 100 may be located within a housing 150. The housing 150 comprises an opening 160 for allowing light to be incident upon the light filtering apparatus 110.

Figure 4:
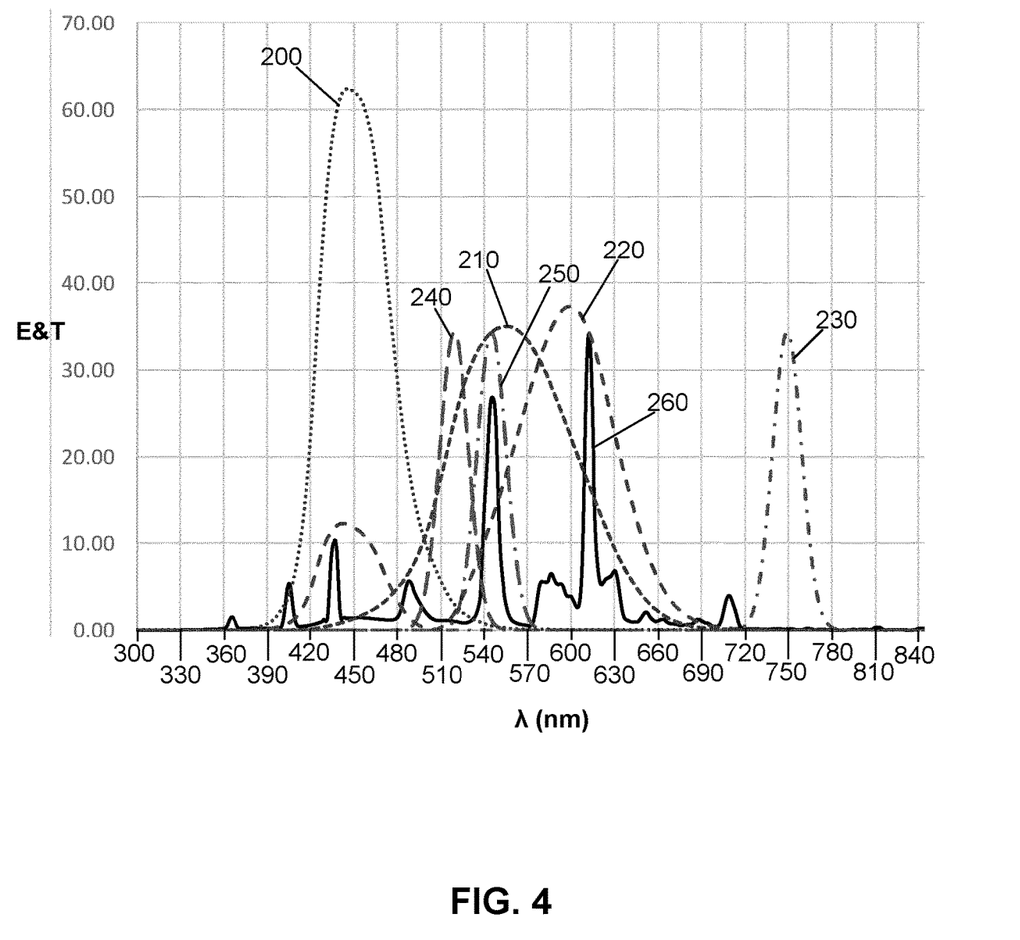
FIG. 4 is a graph showing different spectral positions of wavelength filters of the sensing system of FIG. 3 overlaid with an example of an emission spectrum of a fluorescent light source.

FIG. 4 is a graph showing different spectral positions 200, 210, 220, 230, 240, 250 of wavelength filters of the sensing system of FIG. 3 overlaid with an example of an emission spectrum of a fluorescent light source 260. The x-axis of the graph represents wavelengths A of light ranging from 300 nm to 840 nm. Regarding the emission spectrum of a fluorescent light source 260, the y-axis of the graph represents a relative energy content E of the light source and is unit-less. If desired, the energy content E may alternatively be represented using units of energy (Joules), power (Watts), intensity (Watts per square meter), illuminance (Lux), etc. Regarding the different spectral positions 200, 210, 220, 230, 240, 250 of wavelength filters of the sensing system of FIG. 3, the y-axis represents a relative transmissivity T of the wavelength filters.

The light filtering apparatus may include colour (i.e. red, green and blue) filters that are configured to pass light having a wavelength within a blue spectral region 200, a green spectral region 210 and a red spectral region 220. The blue, red and green spectral regions 200, 210, 220 may correspond to the visible portion of the electromagnetic spectrum as viewed by the standard observer. The light filtering apparatus may include an infrared filter configured to pass light having a wavelength within an infrared spectral region 230.

The light filtering apparatus may be configured to pass a first wavelength of light 240 corresponding to an emission spectrum characteristic of Mercury to distinguish between light emitted by an LED and light emitted by a fluorescent light source. The first wavelength 240 may be between about 509 nm and about 533 nm. The first wavelength may be about 521 nm. Mercury may emit a relatively low amount of light having a wavelength of between about 509 nm and about 533 nm (e.g. about 521 nm). The emission spectrum characteristic of Mercury may be an emission spectrum trough at a wavelength of between about 509 nm and about 533 nm (e.g. about 521 nm). The emission spectrum of a fluorescent light source 260 shows a relative trough at a wavelength of between about 509 nm and about 533 nm (e.g. about 521 nm).

Referring to FIG. 1A, it can be seen that a fluorescent light source (which includes Mercury) emits a relatively low amount of light having a wavelength between about 509 nm and about 533 nm (e.g. about 521 nm). Referring to FIG. 1B, it can be seen that an LED light source (which does not include Mercury) emits a larger amount of light having a wavelength between about 509 nm and about 533 nm (e.g. about 521 nm) than a fluorescent light source. A corresponding difference in sensor responses produced by the sensor 120 of FIG. 3 may be used by the processor 130 to distinguish between light emitted by an LED and light emitted by a fluorescent light source.

The processor 130 may be configured to compare the sensor response to a threshold value to distinguish between light emitted by a fluorescent light source and light emitted by a light emitting diode. The threshold value may be predetermined. The threshold value may comprise one or more of a power value, an intensity value, an irradiance value, an illuminance value, etc. The threshold value may depend upon a size of the sensor 120, a transmissivity of the light filtering apparatus 110 and/or an electronic setting (e.g. a voltage gain and/or a charge integration time) of the sensing system 100. As such, a calibration may be performed to determine the threshold value for a given sensing system 100.

The light filtering apparatus 110 may be configured to pass a second wavelength of light 250 corresponding to a different emission spectrum characteristic of Mercury. Analysing the sensor response at two different wavelengths 240, 250 corresponding to two different emission spectrum characteristics of Mercury may improve an accuracy with which the sensing system 100 can distinguish between an LED light source and a fluorescent light source.

The second wavelength 250 may be between about 534 nm and about 558 nm (e.g. about 546 nm). A fluorescent light source may emit a greater amount of light having a wavelength of between about 534 nm and about 558 nm (e.g. about 546 nm) than light having a wavelength of between about 509 nm and about 533 nm (e.g. about 521 nm). The different emission spectrum characteristic of Mercury may be a spectral peak at a wavelength of between about 534 nm and about 558 nm (e.g. about 546 nm). This difference can be seen in FIG. 4 where the emission spectrum of the fluorescent light source 250 includes a relative trough proximate the first wavelength 240 and a relative peak proximate the second wavelength 250.

An LED light source (which does not include Mercury) may emit a larger amount of light having a wavelength between about 534 nm and about 558 nm (e.g. about 546 nm) than a fluorescent light source (which does include Mercury). The difference in sensor responses produced by the sensor 120 may be used by the processor 130 to distinguish between light emitted by the LED light source and light emitted by the fluorescent light source.

The processor 130 may be configured to calculate a value that is at least partially dependent upon sensor responses to the first and second wavelengths of light 240, 250. The processor 130 may be configured to compare the calculated value to a threshold value to distinguish between light emitted by a fluorescent light source and light emitted by an LED. For example, an LED light source may generate similar sensor responses to wavelengths of light between about 534 nm and about 558 nm (e.g. about 546 nm) and to wavelengths of light between about 509 nm and about 533 nm (e.g. about 521 nm). A ratio of the sensor responses to wavelengths of light between about 534 nm and about 558 nm (e.g. about 546 nm) and to wavelengths of light between about 509 nm and about 533 nm (e.g. about 521 nm) under an LED light source may, for example, be substantially equal to one.

In contrast, due to the presence of Mercury, a fluorescent light source may generate a smaller sensor response to wavelengths of light between about 509 nm and about 533 nm (e.g. about 521 nm) and a larger sensor response to wavelengths of light between about 534 nm and about 558 nm (e.g. about 546 nm). That is, light emitted by a fluorescent light source may generate a peak sensor response to wavelengths of light between about 534 nm and about 558 nm (e.g. about 546 nm) and a trough sensor response to wavelengths of light between about 509 nm and about 533 nm (e.g. about 521 nm). A ratio of the sensor responses to wavelengths of light between about 509 nm and about 533 nm (e.g. about 521 nm) and to wavelengths of light between about 534 nm and about 558 nm (e.g. about 546 nm) under a fluorescent light source may not be substantially equal to one. Given this, ratios of sensor responses to wavelengths of light between about 509 nm and about 533 nm (e.g. about 521 nm) and to wavelengths of light between about 534 nm and about 558 nm (e.g. about 546 nm) may be used to distinguish between light emitted by an LED light source and light emitted by a fluorescent light source.

A further increase in accuracy when distinguishing between light emitted by an LED light source and light emitted by a fluorescent light source may be achieved by considering an additional wavelength of light. For example, the sensor response under a green filter may also be considered.

The human eye weights detected light in at least partial dependence on the wavelength of the detected light. For example, wavelengths of light corresponding to the green portion of the electromagnetic spectrum may generate a larger response in the human eye than equivalent intensities wavelengths of light corresponding to the red and blue portions of the electromagnetic spectrum. The sensor response to wavelengths of light corresponding to the green portion of the electromagnetic spectrum may be used to provide an illuminance value (i.e. an intensity as perceived by the human eye). The sensor response to wavelengths of light corresponding to the visible portion of the electromagnetic spectrum (i.e. the red, green and blue spectral portions) may provide an irradiance value (i.e. an objective intensity of detected light). The sensor response to wavelengths of light corresponding to the green portion of the electromagnetic spectrum may be used to normalise different measurements made by the sensor 120. Normalising different measurements made by the sensor 120 according to the sensor response to wavelengths of light corresponding to the green portion of the electromagnetic spectrum may improve an accuracy of colour detection and/or display on an electronic display as perceived by the human eye.

The light filtering apparatus 110 may be configured to pass wavelengths of light corresponding to the green portion of the electromagnetic spectrum. The processor 130 may be configured to calculate a value that is at least partially dependent upon sensor responses to the first and second wavelengths of light 240, 250 and the green light 210. The processor 130 may be configured to compare the calculated value to a threshold value to distinguish between light emitted by a fluorescent light source and light emitted by a light emitting diode.

Figure 5:
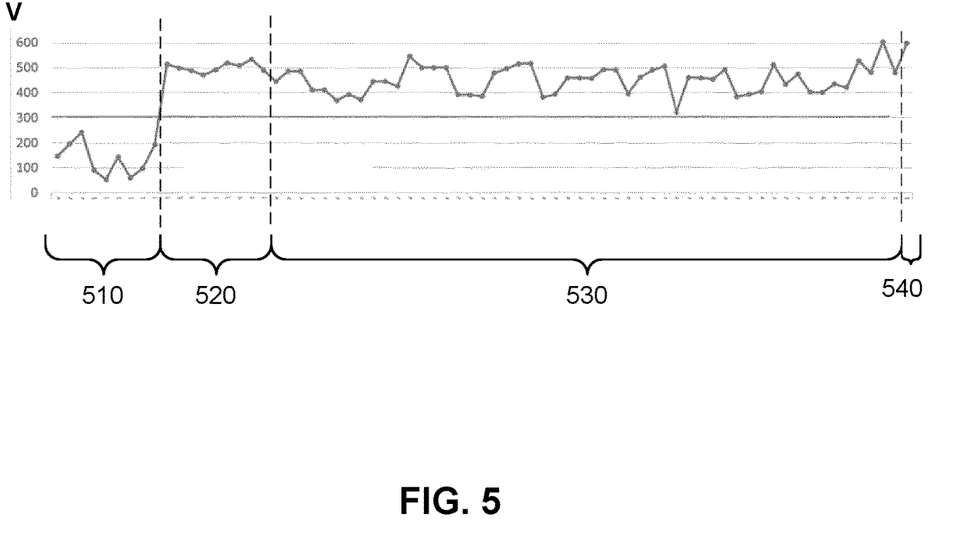
FIG. 5 is a graph showing calculated values for distinguishing between light emitted by a fluorescent light source and light emitted by other types of light source.
Figure 6:
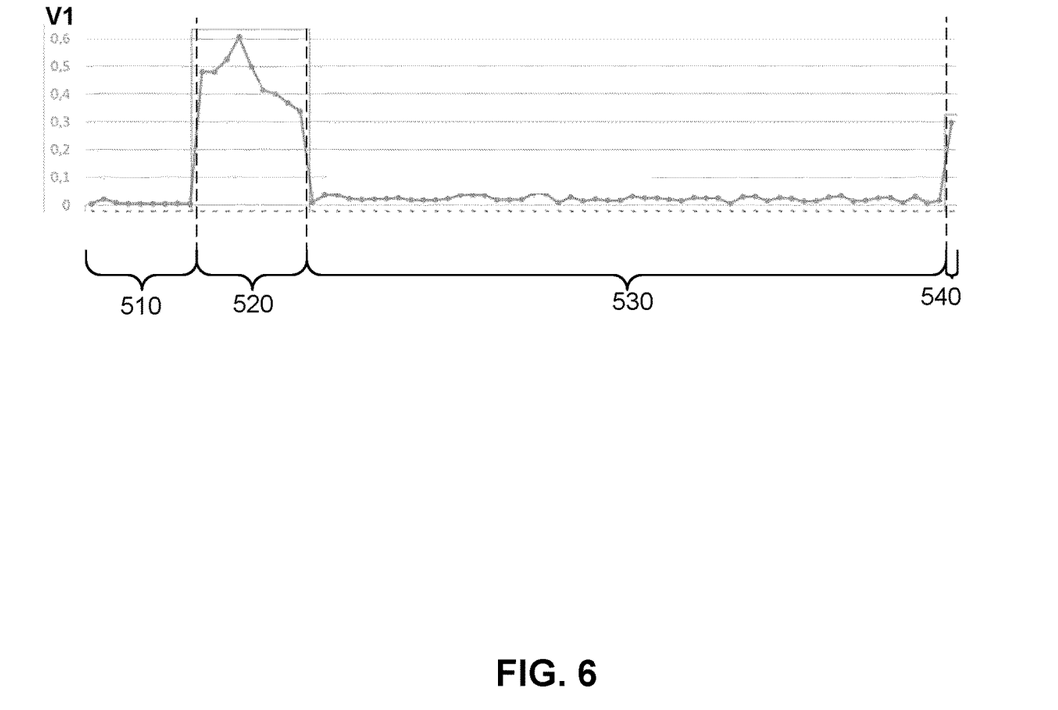
FIG. 6 is a graph showing calculated values for distinguishing between light emitted by an incandescent light source or the sun, and light emitted by other types of light source.
Figure 7:
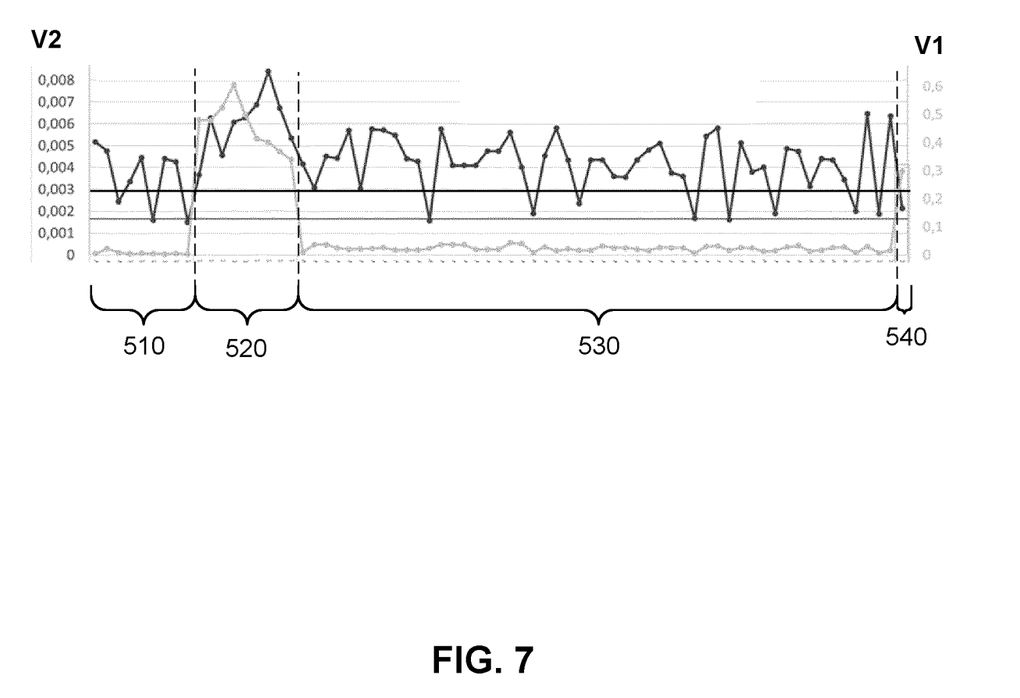
FIG. 7 is a graph showing the calculated values of FIG. 6 along with a second set of calculated values for distinguishing between light emitted by an incandescent light source and light emitted by the sun.

FIGS. 5-7 are graphs showing three different simulations performed using seventy-one different light sources. The different light sources consist of nine different types of fluorescent light source, fifty-two different types of LED, nine different types of incandescent light sources (including halogen light sources) and sunlight. The x-axis of each graph corresponds to the results of the simulations for each of the seventy-one different light sources. The x-axis is split into four groups: a first group 510 comprising nine different fluorescent light sources, a second group 520 comprising nine different incandescent light sources, a third group 530 comprising fifty-two different types of LED light sources and a fourth group 540 comprising sunlight. The y-axis of each graph corresponds to calculated values V for distinguishing between the different types of light. The calculated values at least partially depend upon sensor responses to the different types of light 510, 520, 520, 540.

FIG. 5 is a graph showing calculated values V for distinguishing between light emitted by a fluorescent light source 510 and light emitted by the other types of light source 520, 530, 540. In the example of FIG. 5, the calculated values comprise a ratio of the sensor responses to the first and second wavelengths of light 240, 250 and green light 210. For example, the calculated value V may take the following form:

$$V = ((S_{\lambda 1} \div S_{\lambda 2}) \div S_{\lambda G})^{-1}$$

where $S_{\lambda 1}$ is the sensor response to the first wavelength, $S_{\lambda 2}$ is the sensor response to the second wavelength and $S_{\lambda G}$ is the sensor response to the green light.

In the example of FIG. 5, if the calculated value V is less than a threshold value of three-hundred then the light type is identified as having been emitted by a fluorescent light source 510 rather than an incandescent light source 520, an LED 530 or the sun 540. It will be understood that three-hundred is merely an example of a threshold value and that any value may represent the threshold value for a given system and a given calculation of the calculated value V.

FIG. 6 is a graph showing calculated values V for distinguishing between light emitted by an incandescent light source 520 or the sun 540, and light emitted by other types of light source (i.e. an LED 530 or a fluorescent light source 510). The light filtering apparatus 110 may be configured to pass infrared wavelengths of light 230 and green wavelengths of light 210. The processor 130 may be configured to calculate a second value that is at least partially dependent upon sensor responses to the infrared light 230 and the green light 210. The processor 130 may be configured to compare the second value to a second threshold value to distinguish between light emitted by an incandescent light source 520 or the sun 540, and light emitted by a fluorescent light source 510 or an LED 530

In the example of FIG. 6, the calculated values V1 comprise a ratio of the sensor responses to the infrared light 230 and the green light 210. For example, the calculated value V1 may take the following form:

$$V1 = S_{\lambda IR} \div S_{\lambda G}$$

where $S_{\lambda IR}$ is the sensor response to the infrared light and $S_{\lambda G}$ is the sensor response to the green light.

In the example of FIG. 6, if the calculated value V1 is greater than a threshold value of 0.1 then the light type is identified as being emitted by either an incandescent light source 520 or the sun 540. It will be understood that 0.1 is merely an example of a threshold value and that any value may represent the threshold value for a given system and a given calculation of the calculated value V1.

Additional information from the sensor 120 may be used to distinguish between light emitted by an incandescent light source 520 and light emitted by the sun 540. FIG. 7 is a graph showing the calculated values V1 of FIG. 6 along with a second set of calculated values V2 for distinguishing between light emitted by an incandescent light source 520 and light emitted by the sun 540. The light filtering apparatus 110 may be configured to pass blue light 200 and red light 220. The processor 130 may be configured to calculate a third value that is at least partially dependent upon sensor responses to the blue light 200, the red light 220 and the green light 210. The processor 130 may be configured to compare the third value to a third threshold value to distinguish between light emitted by an incandescent light source 520, and light emitted by the sun 540.

In the example of FIG. 7, the second set of calculated values V2 comprises a ratio of the sensor responses to the blue light 200, the red light 220 and the green light 210. For example, the second calculated value V2 may take the following form:

$$V2 = (S_{\lambda,B} + S_{\lambda,R}) \div S_{\lambda,G}$$

where $S_{\lambda,B}$ is the sensor response to the blue light, $S_{\lambda,R}$ is the sensor response to the red light and $S_{\lambda,G}$ is the sensor response to the green light.

In the example of FIG. 7, if the first calculated value V1 is greater than 0.1 and the second calculated value V2 is less than 0.003 then the light is identified as being sunlight 540 rather than light emitted from a fluorescent light source 510, an incandescent light source 520 or an LED 530.

Once the light type has been identified, the light type identification information may be used to improve an accuracy of a colour sensor and/or an electronic display. For example, an intensity and/or a colour balance on the electronic display may be adjusted in at least partial dependence on the light type identification information provided by the sensing system 100. This may significantly improve a colour point or tri-stimulus measurement accuracy (i.e. XYZ or RGB value) of the colour sensor and/or electronic display. The sensing system 100 may form part of an ambient light sensor. The ambient light sensor may form part of a mobile electronic device, such as a smartphone.

Figure 8:
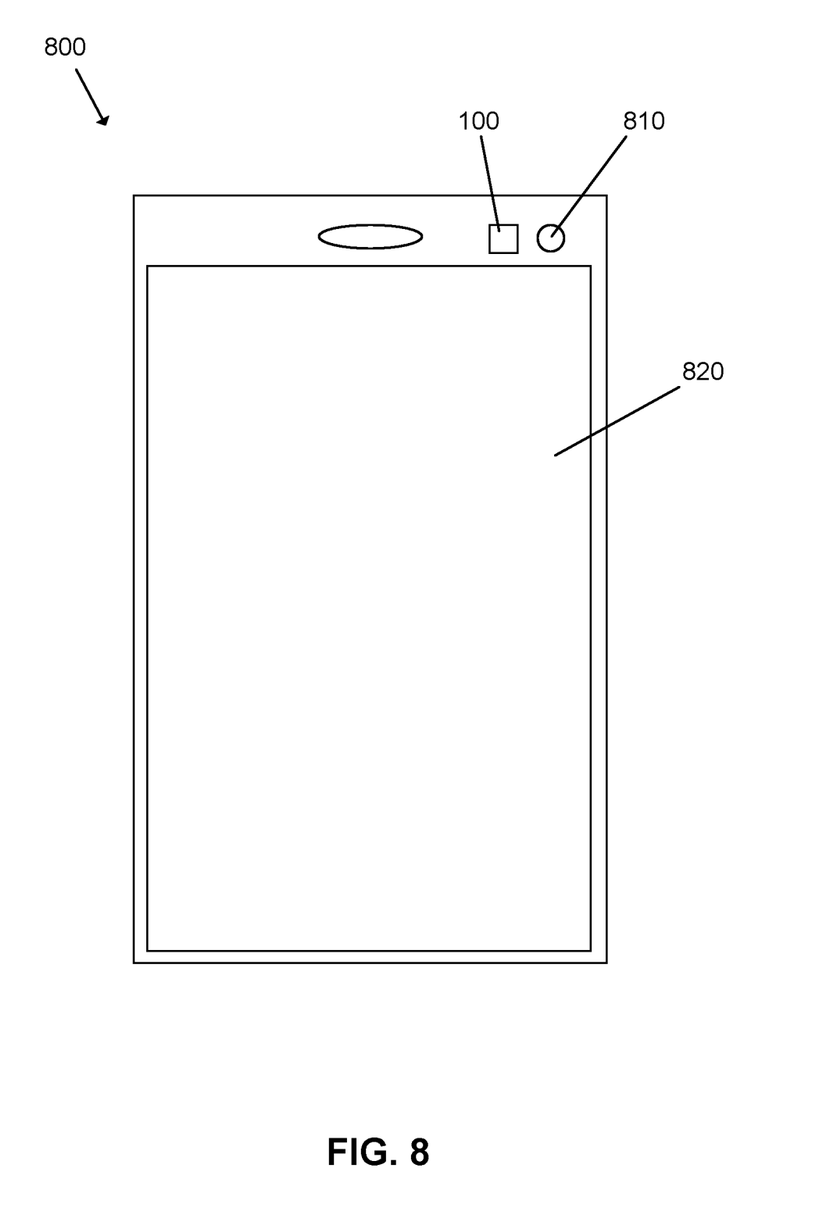
FIG. 8 schematically depicts an electronic device comprising the sensing system of FIG. 3; and, FIG. 9 shows a flowchart of a method of sensing light.

FIG. 8 schematically depicts an electronic device 800 comprising the sensing system 100 of FIG. 3. The electronic device comprises a colour sensing system 810. The colour sensing system 810 is configured to use light source distinguishing information provided by the sensing system 100. The sensing system 100 advantageously improves an accuracy of the colour sensing system by informing the colour sensing system of ambient light conditions (i.e. whether the electronic device 800 is operating under LEDs, sunlight, incandescent light sources and/or fluorescent light sources).

A memory of the colour sensing system 810 may comprise one or more ambient light matrices that represent different sensor 810 and/or display 820 settings optimized for different types of light. Once the sensing system 100 has identified the type(s) of light that the colour sensing system 810 is operating under, the colour sensing system 810 may be configured to select a corresponding ambient light matrix from its memory to improve an accuracy of colour measurements and/or an accuracy of a colour display on the electronic display 820.

The electronic device 800 comprises an electronic display 820. The electronic device 800 is configured to control the electronic display 820 in at least partial dependence on light source distinguishing information provided by the sensing system 100. The sensing system 100 advantageously improves a colour display accuracy of the electronic display by informing the electronic device 800 of ambient light conditions (i.e. whether the electronic device 800 is operating under LEDs, sunlight, incandescent light sources and/or fluorescent light sources)

The electronic device 800 may be configured to perform an automatic white balance of the electronic display 820 in at least partial dependence on light source distinguishing information provided by the sensing system 100. The sensing system 100 advantageously provides light type distinguishing information that improves an accuracy of the auto white balancing process.

Figure 9:
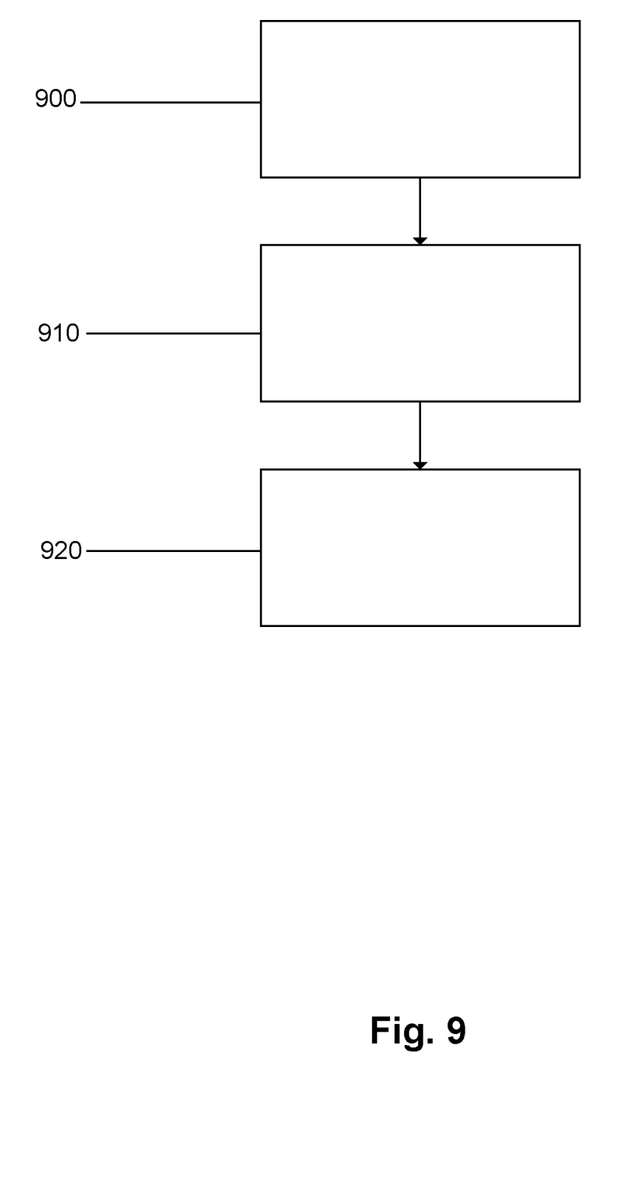

FIG. 9 shows a flowchart of a method of sensing light. A first step 900 of the method comprises filtering incident light to pass a first wavelength of light corresponding to an emission spectrum characteristic of Mercury. A second step 910 of the method comprises detecting the filtered light to produce a sensor response that is indicative of the detected light. A third step 920 of the method comprises using the sensor response to distinguish between light emitted by a fluorescent light source and light emitted by a light emitting diode. The method may be performed using the sensing system 100 of FIG. 3. A computer program comprising computer readable instructions may be configured to cause a computer to carry out the method of FIG. 9. A computer readable medium may be used to carry the computer program.

Embodiments of the invention may be used in many different applications, such as for example a mobile phone (e.g. a smartphone), a tablet computer, a laptop computer, a computer monitor, a car dashboard and/or navigation system, an interactive display in a public space, a home assistant, etc.

Spectral light type identification can be used in various fields. Knowing the ambient light type (i.e. incandescent (including halogen), LED, fluorescent and/or sunlight) enables an improvement of a performance of a colour sensing system. Light type identification information may be used for display colour adoption and/or as an auxiliary sensor for auto white balancing of an electronic display.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure that are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A sensing system comprising:
    a light filtering apparatus configured to:
        pass a first wavelength of light corresponding to an emission spectrum characteristic of Mercury, wherein the first wavelength is between about 509 nm and about 533 nm, and
        the light filtering apparatus is configured to pass a second wavelength of light corresponding to a different emission spectrum characteristic of Mercury, wherein the second wavelength is between about 534 nm and about 558 nm;
    a sensor configured to receive light passed by the light filtering apparatus and produce a sensor response that is indicative of the light passed by the light filtering apparatus; and, a processor configured to:
    calculate a value that is at least partially dependent upon sensor responses to the first and second wavelengths of light; and,
    compare the value to a threshold value to distinguish between light emitted by a fluorescent light source and light emitted by a light emitting diode.

2. The sensing system of claim 1, wherein the first wavelength is about 521 nm.

3. The sensing system of claim 1, wherein the processor is configured to compare the sensor response to a threshold value to distinguish between light emitted by a fluorescent light source and light emitted by a light emitting diode.

4. The sensing system of claim 1, wherein the second wavelength is about 546 nm.

5. The sensing system of claim 1, wherein the light filtering apparatus is configured to pass green light, and wherein the processor is configured to:
    calculate a value that is at least partially dependent upon sensor responses to the first and second wavelengths of light and the green light; and,
    compare the value to a threshold value to distinguish between light emitted by a fluorescent light source and light emitted by a light emitting diode.

6. The sensing system of claim 1, wherein the light filtering apparatus is configured to pass infrared light and green light, and wherein the processor is configured to:
    calculate a second value that is at least partially dependent upon sensor responses to the infrared light and the green light; and,
    compare the second value to a second threshold value to distinguish between light emitted by an incandescent light source or the sun, and light emitted by a fluorescent light source or a light emitting diode.

7. The sensing system of claim 6, wherein the light filtering apparatus is configured to pass blue light and red light, and wherein the processor is configured to:
    calculate a third value that is at least partially dependent upon sensor responses to the blue light, the red light and the green light; and,
    compare the third value to a third threshold value to distinguish between light emitted by an incandescent light source, and light emitted by the sun.

8. The sensing system of claim 1, wherein the light filtering apparatus comprises an interference filter.

9. An electronic device comprising:
the sensing system of claim 1; and,
a colour sensing system configured to use light source distinguishing information provided by the sensing system.

10. The electronic device of claim 9, further comprising an electronic display, wherein electronic device is configured to control the electronic display in at least partial dependence on light source distinguishing information provided by the sensing system.

11. The electronic device of claim 10, wherein the electronic device is configured to perform an automatic white balance of the electronic display in at least partial dependence on light source distinguishing information provided by the sensing system.

12. A method of sensing light comprising:
filtering incident light to pass a first wavelength of light corresponding to an emission spectrum characteristic of Mercury;
detecting the filtered light to produce a sensor response that is indicative of detected light; and,
using the sensor response to distinguish between light emitted by a fluorescent light source and light emitted by a light emitting diode.

13. The method of claim 12, comprising comparing the sensor response to a threshold value to distinguish between light emitted by a fluorescent light source and light emitted by a light emitting diode.

14. The method of claim 12, comprising:
filtering incident light to pass a second wavelength of light corresponding to a different emission spectrum characteristic of Mercury;
calculating a value that is at least partially dependent upon sensor responses to the first and second wavelengths of light; and,
comparing the value to a threshold value to distinguish between light emitted by a fluorescent light source and light emitted by a light emitting diode.

15. The method of claim 12, comprising:
filtering incident light to pass a second wavelength of light corresponding to a different emission spectrum characteristic of Mercury and to pass green light;
calculating a value that is at least partially dependent upon sensor responses to the first and second wavelengths of light and the green light; and,
comparing the value to a threshold value to distinguish between light emitted by a fluorescent light source and light emitted by a light emitting diode.

16. The method of claim 12, comprising:
filtering incident light to pass infrared light and green light;
calculating a second value that is at least partially dependent upon sensor responses to the infrared light and the green light; and,
comparing the second value to a second threshold value to distinguish between light emitted by an incandescent light source or the sun, and light emitted by a fluorescent light source or a light emitting diode.

17. The method of claim 16, comprising:
filtering incident light to pass blue light and red light;
calculating a third value that is at least partially dependent upon sensor responses to the blue light, the red light and the green light; and,
comparing the third value to a third threshold value to distinguish between light emitted by an incandescent light source, and light emitted by the sun.

18. The method of claim 12, comprising controlling an electronic display in at least partial dependence on light source distinguishing information.

19. The method of claim 18, comprising performing an automatic white balance of the electronic display in at least partial dependence on light source distinguishing information.

20. A computer program comprising computer readable instructions configured to cause a computer to carry out a method according to claim 12.

21. A computer readable medium carrying a computer program according to claim 20.

* * * * *